Aug. 27, 1935.  F. A. PARSONS  2,012,672
MILLING MACHINE TRANSMISSION AND CONTROL
Filed Nov. 30, 1932  7 Sheets-Sheet 2
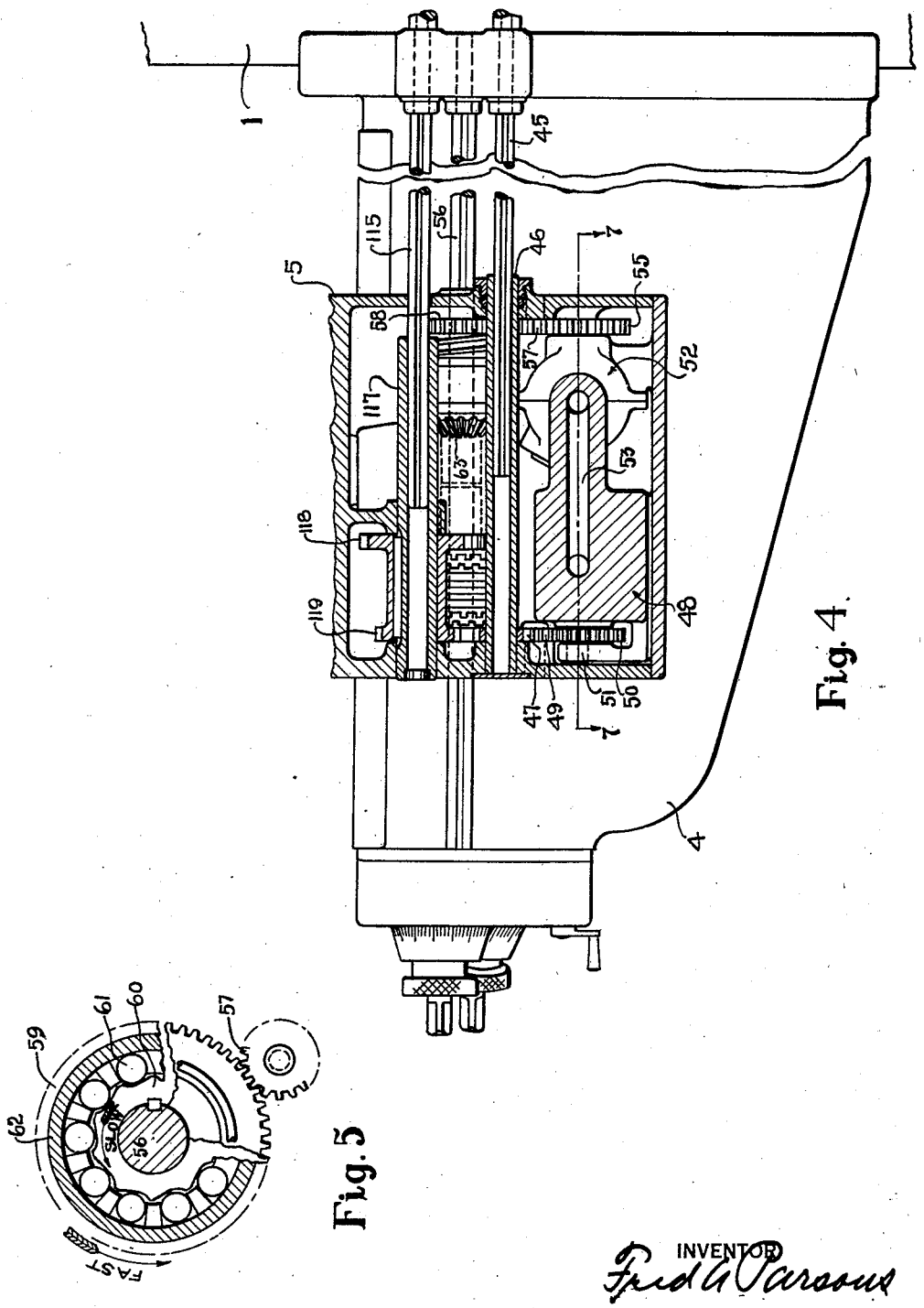

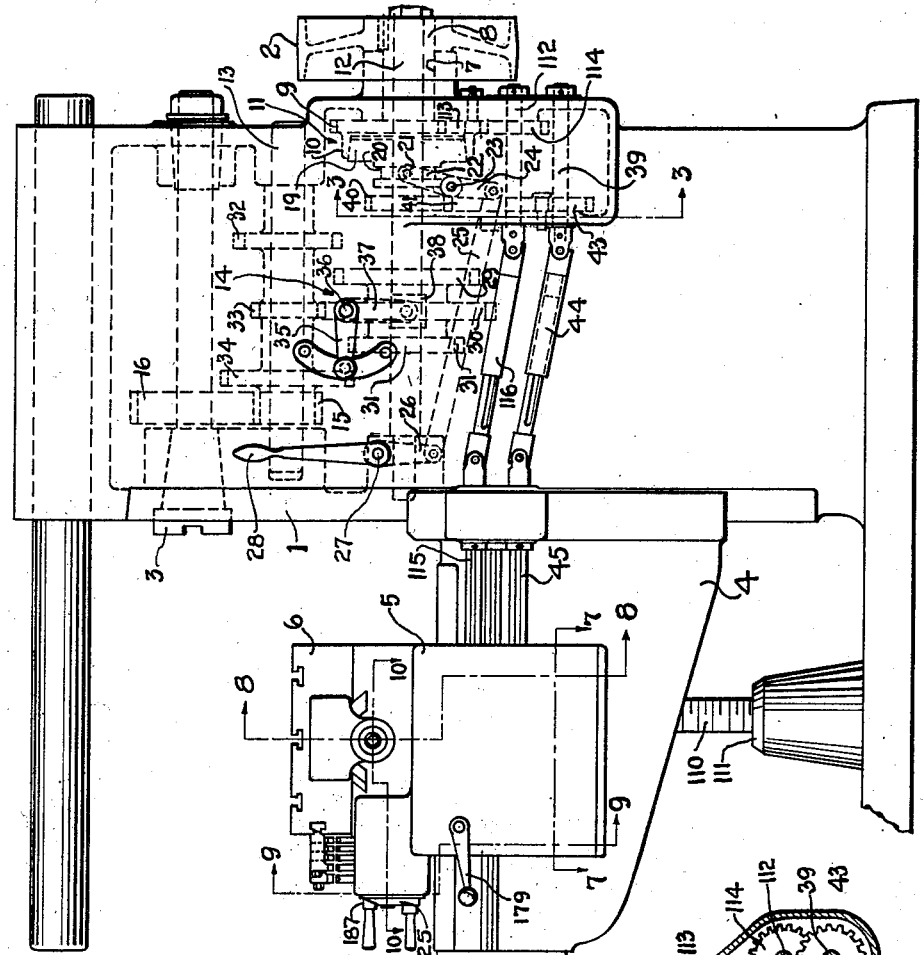
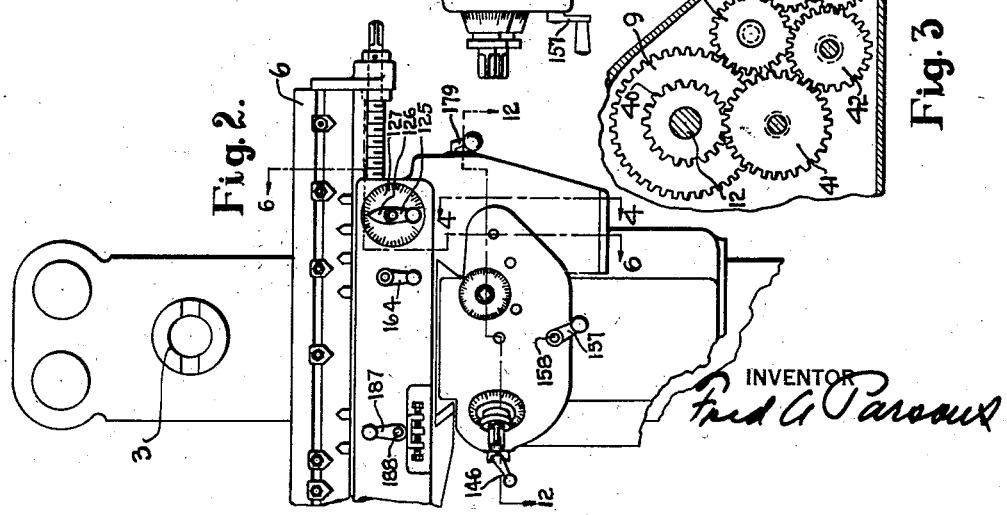

Aug. 27, 1935.  F. A. PARSONS  2,012,672
MILLING MACHINE TRANSMISSION AND CONTROL
Filed Nov. 30, 1932   7 Sheets-Sheet 3

INVENTOR
Fred G. Parsons

Aug. 27, 1935.    F. A. PARSONS    2,012,672
MILLING MACHINE TRANSMISSION AND CONTROL
Filed Nov. 30, 1932    7 Sheets-Sheet 4

INVENTOR
Fred A Parsons

Aug. 27, 1935.　　F. A. PARSONS　　2,012,672
MILLING MACHINE TRANSMISSION AND CONTROL
Filed Nov. 30, 1932　　7 Sheets-Sheet 5

INVENTOR
Fred A. Parsons

Aug. 27, 1935.　　　F. A. PARSONS　　　2,012,672
MILLING MACHINE TRANSMISSION AND CONTROL
Filed Nov. 30, 1932　　　7 Sheets-Sheet 7

INVENTOR
Fred A. Parsons

Patented Aug. 27, 1935

2,012,672

UNITED STATES PATENT OFFICE 2,012,672

MILLING MACHINE TRANSMISSION AND CONTROL

Fred A. Parsons, Milwaukee, Wis., assignor to Kearney & Trecker Corporation, West Allis, Wis.

Application November 30, 1932, Serial No. 644,953

16 Claims. (Cl. 90—21)

This invention relates to milling machines and more particularly to the transmission and control mechanism for milling machines commonly known as the knee and column type.

It is a purpose of the invention to provide transmission mechanism for a knee and column type of milling machine, combining in part the advantages of a hydraulic transmission for the actuation of the knee, table, and saddle thereof with the advantages and convenience of hand and automatic controlling mechanism for the movements of the knee, table, and saddle of previous mechanical transmissions.

A further purpose is to provide in a knee type milling machine a transmission in part hydraulic but capable of operation after the manner of well known control devices for mechanically actuated supports at least so far as concerns certain of the control mechanism normally most frequently operated, whereby operators familiar with previous mechanically operated machines of this type may proceed with confidence in a familiar manner and without regard for the fact that the transmission is in part of hydraulic nature.

Another purpose is to provide a knee type milling machine with transmission mechanism in which a portion common to the movement of the knee, table, and saddle thereof is replaced and includes a hydraulic transmission in a manner such that the same hydraulic transmission may be used for the operation of either the knee, table, or the saddle, and in a manner such that the remainder of the transmission may be of simplified and strictly mechanical construction.

A further purpose is to provide a milling machine having transmission mechanism for relative movement of the work and tool in a number of different paths in which a portion of the transmission common to each path of movement for effecting variations in a feed or cutting rate therefor is hydraulic in its nature and combined with an improved and simplified manner that other transmission mechanism common to each of the paths of movement in a manner such that quick traverse movements of the various movable supports may be effected by strictly mechanical means.

Other purposes relate to the combination of mechanism for one or more of the purposes previously mentioned in an improved and simplified manner with other transmission mechanism of the machine such, for instance, as the spindle transmission and in an improved and simplified manner with respect to the structure specific to a knee and column type milling machine.

Other purposes relate generally to the improvement and simplification of transmission and control mechanism for effecting the purposes above referred to, and still other purposes will be apparent from the specification and claims herein.

The invention consists in the structure herein illustrated, described, and claimed, together with such modifications thereof as may be equivalent to the structure claimed.

In the drawings the same reference characters have been applied to the same parts in each of the several views of which:

Fig. 1 is a right-side elevation of the knee type milling machine incorporating the invention.

Fig. 2 is a partial front elevation of the same machine.

Fig. 3 is a partial section along line 3—3 of Fig. 1.

Fig. 4 is a section of the saddle mechanism taken along line 4—4 of Figs. 2 and 9.

Fig. 5 is a section through an overrunning clutch mechanism along line 5—5 of Fig. 6.

Figures 6, 7:
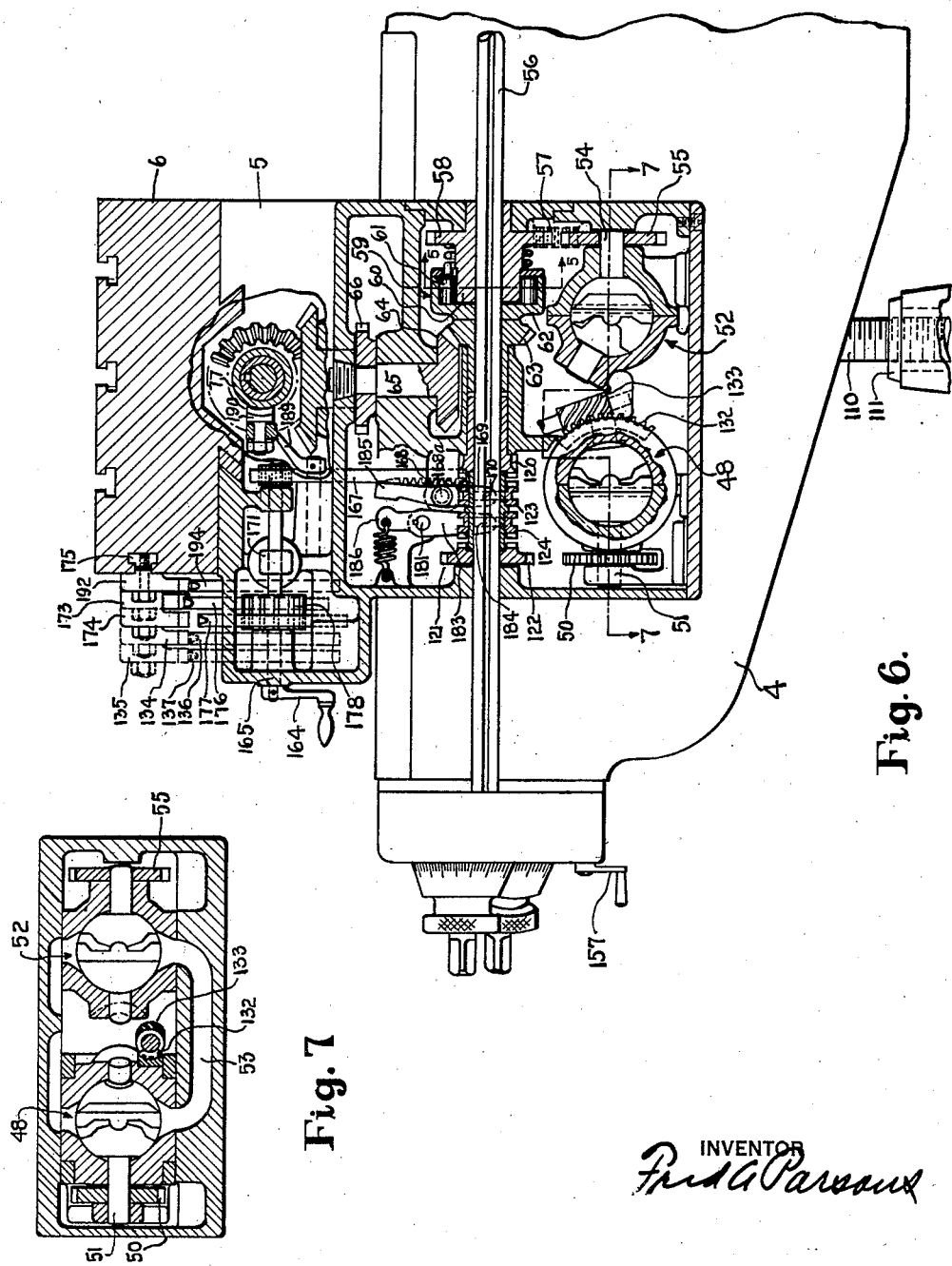
Fig. 6 is a section approximately along line 6—6 of Figs. 2 and 9.
Fig. 7 is a section through a hydraulic pump and motor taken approximately at line 7—7 of Figs. 1 and 4.

In the machine disclosed, a column 1 supports a main or driving pulley 2 driven from any suitable power source. A tool spindle or support 3 is likewise rotatably supported from column 1. Slidably guided for vertical movement adjacent the front wall of column 1 is a knee or support 4 upon which a saddle or support 5 is slidably mounted and guided for movement toward and from the column. Saddle 5 carries a table or support 6 longitudinally guided in suitable ways in saddle 5. The movements of the knee, saddle, and table together provide table movement in three transverse paths for work supported on table 6, relative to a cutting tool supported and driven from spindle 3.

Spindle 3 is driven from pulley 2 as follows: Pulley 2 is fixed on a sleeve 8 for rotation in a bore 7 in column 1 and fixed with said sleeve is a gear 9 and a member 10 of a clutch generally denoted by the numeral 11. A shaft 12 driven through clutch 11 drives a shaft 13 through a rate changer generally denoted by the numeral 14. Shaft 13 drives spindle 3 through gears 15 and 16.

Clutch 11 may be of any suitable design but as here shown consists of the member 10 fixed on sleeve 8 and a member 19 slidably keyed to shaft 12, the members having complementary friction surfaces adapted for engagement in the one position of member 19. Clutch 11 may be engaged or disengaged as follows: An annular groove 20 in member 19 engages a shoe or pin 21 pivoted in a lever 22 fixed on a shaft 23 upon which is also fixed a lever 24. A link or rod 25 connects lever 24 with a lever 26 fixed on a shaft 27 upon which is fixed a hand lever 28 exposed for manual operation outside the column.

The rate changer 14 consists of different diametered gears 29, 30, and 31 fixed together and slidably keyed on shaft 12 for engagement one at a time with complementary gears 32, 33, and 34 fixed on shaft 13. The rate changer is operated by a lever 35 fixed on a shaft 36 which carries a lever 37 having a pivoted fork 38 engaging the sides of gear 30.

A feed rate train for movement of table 6 in any of its three paths of movement originates in pulley 2 and is driven through clutch 11 as follows: A shaft 39 is driven from shaft 12 through a gear 40, fixed on shaft 12, idler gears 41 and 42 and a gear 43 fixed on shaft 39. An extensible universal joint shaft 44 of well known design connects shaft 39 with a shaft 45 supported from knee 4 and slidably engaged with a hollow shaft or sleeve 46, Figs. 4 and 9, on which is fixed a gear 47 driving a fluid pump, generally denoted by numeral 48, Figs. 4, 6, through idler gear 49 and gear 50 fixed on shaft 51 of pump 48, Figs. 4 and 9. The pump 48 is a variable delivery pump connected for operation of a fluid operable motor generally denoted by numeral 52 through a connecting channel 53, Figs. 4, 7, 9. The pump 48 and motor 52 as shown are of the type disclosed in Patents 1,678,049 and 1,678,050, each issued July 24, 1928, but any other suitable types of adjustable pump and fluid motor may obviously be used. The pump and motor are supported from saddle 5 and both enclosed in a reservoir adapted to supply fluid to the pump and receive fluid from the motor, as may be seen in various views as, for instance, Figs. 6, 7, 9, etc. Motor 52 has a driven shaft 54 on which is fixed a gear 55, Figs. 4, 6, and 8, which normally drives a shaft 56 through an idler gear 57, a gear 58, and an overrunning clutch device generally denoted by numeral 59.

Shaft 56 may be alternatively driven by quick traverse mechanism, as later described, and from this shaft the table 6 may be selectively driven in either direction in each of its longitudinal, cross, or vertical movements by the actuation of the table, saddle, or knee respectively.

The overrunning clutch device 59 may be any suitable one of several well-known forms, but as here shown consists of an inner member 60, Figs. 5 and 6, fixed with gear 58 and having a plurality of cam shaped recesses containing ball or roller members 61, normally spring pressed to engage and drive an outer member 62 keyed on shaft 56 for the shaft to be slidable therethrough. The construction is such that whenever shaft 56 and member 62 are, by the quick traverse mechanism later described, driven in the same direction at a rate faster than motor 52 drives gear 58, the rollers 61 are disengaged from driving member 62 and the shaft 56 is driven from the quick traverse train but immediately the quick traverse train is disengaged, member 62 drives shaft 56 at a feed rate determined by the adjustment of pump 48.

Figure 8:
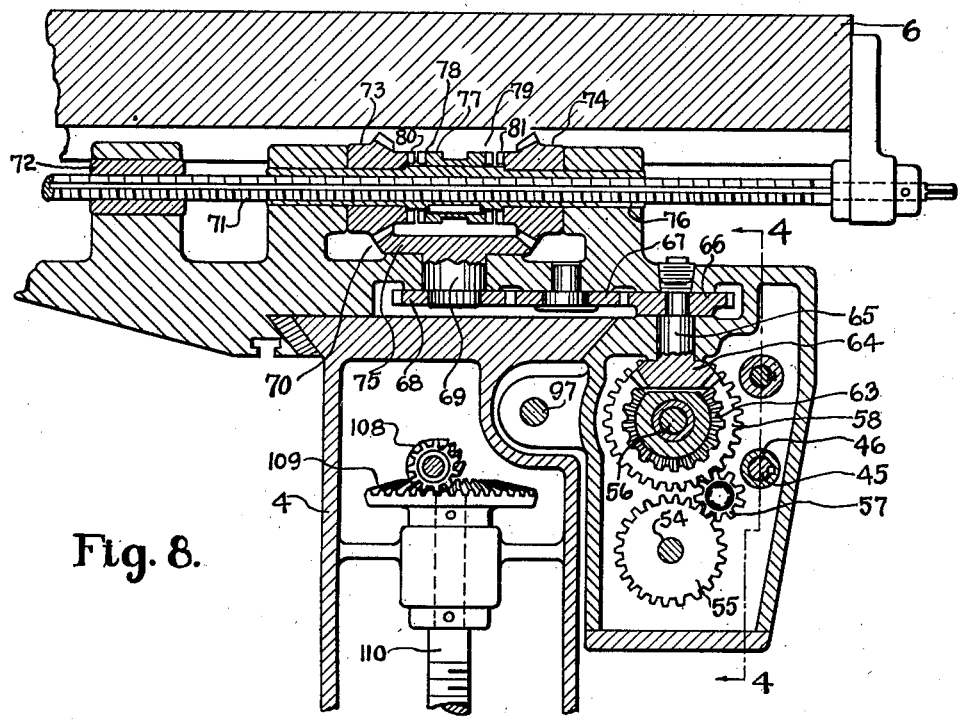
Fig. 8 is a section taken along line 8—8 in Fig. 1.

Table 6 may be driven longitudinally from shaft 56 by the means of bevel gears 63, 64, Figs. 6, 8, shaft 65, gear 66, 67, 68, shaft 69, a reverser generally denoted by the numeral 70 and a screw 71 rotatably journaled in table 6 and engaging a nut 72 fixed with the saddle 5.

Figure 10:
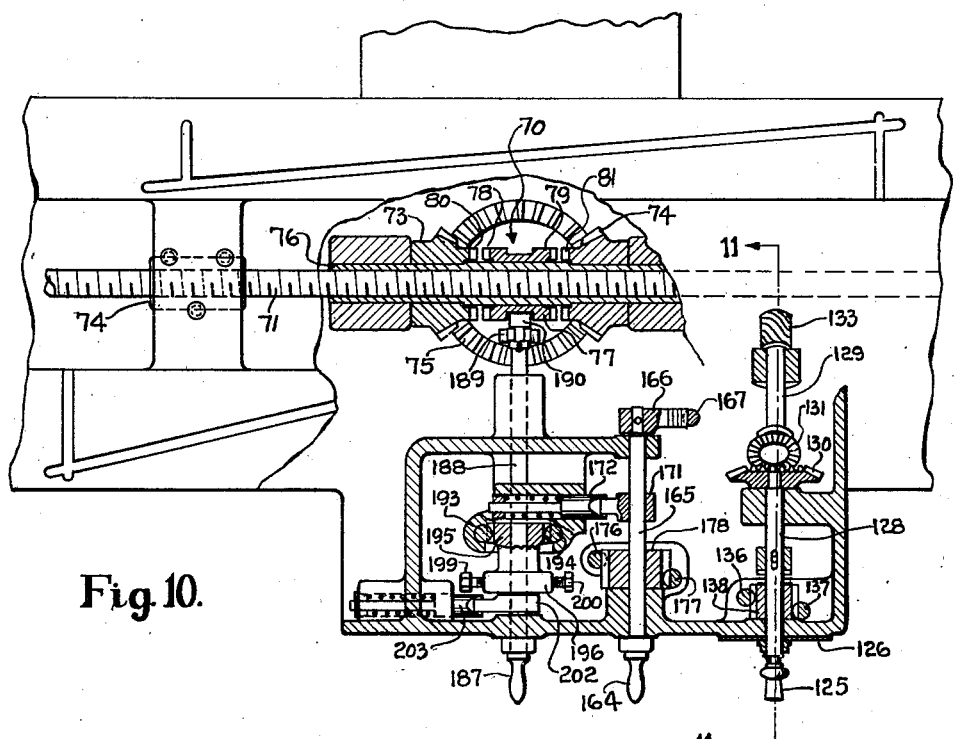
Fig. 10 is a section taken along line 10—10 in Fig. 1.

Reverser 70, Figs. 8 and 10, consists of oppositely running bevel gears 73 and 74 meshing with a drive gear 75 fixed on shaft 69. Gears 73 and 74 are rotatable on a sleeve 76 slidably keyed with table screw 71. A clutch member 77 is slidably keyed on sleeve 75 and has clutch teeth 78 and 79 adapted for alternative engagement with complementary clutch teeth 80 on gear 73 and 81 on gear 74. Clutch member 77 may be manually or automatically shifted by mechanism which will be later explained and has an intermediate or central position disengaging the member from both the gears 73, 74 whereby the table movement may be stopped or interrupted.

Figure 12:
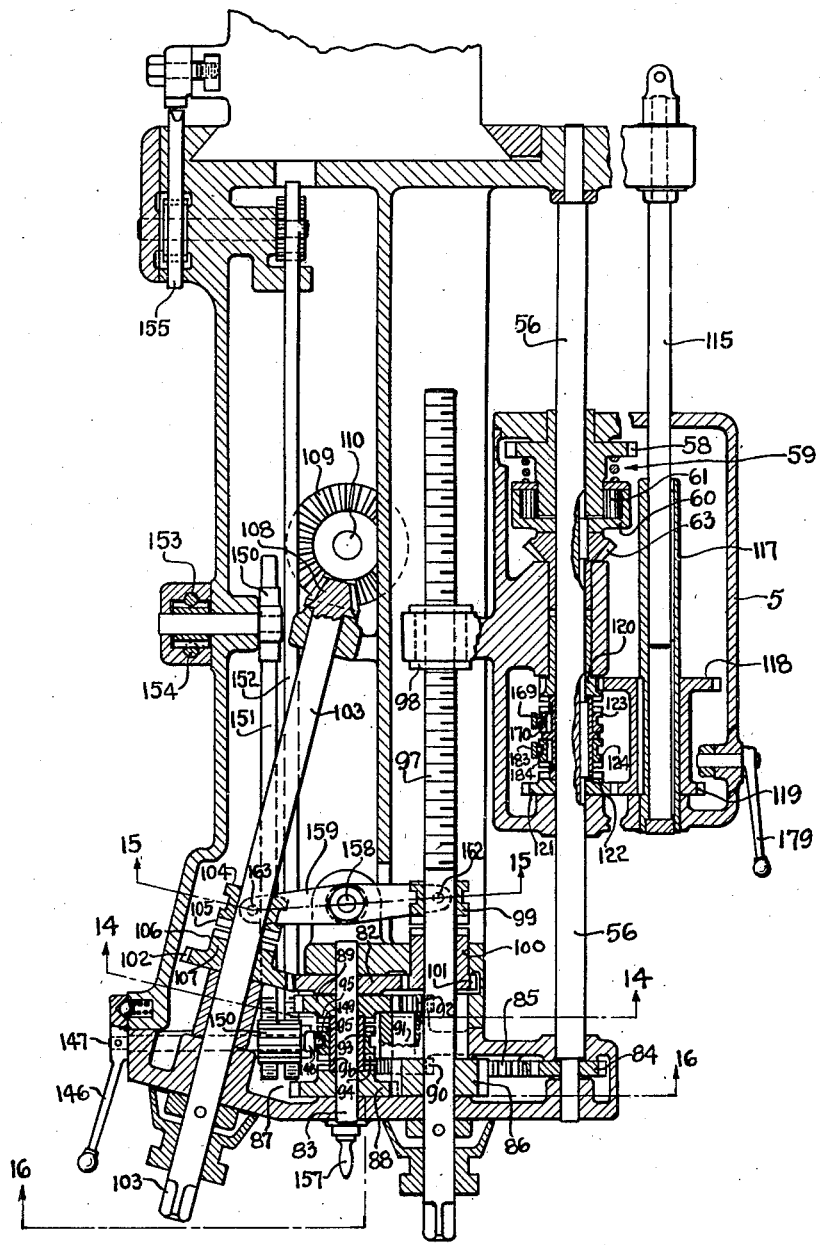
Fig. 12 is a section along line 12—12 in Fig. 2.
Figure 16:
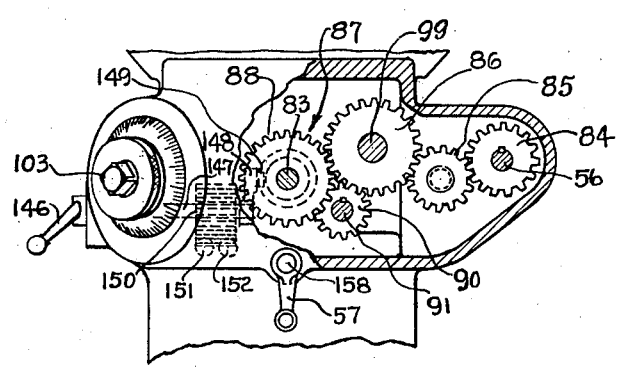
Fig. 16 is a partial section along line 16—16 in Fig. 12.

The cross movement of saddle 5 and vertical movement of knee 4 may be obtained from shaft 56 through the following mechanism. A gear 82 fixed on a shaft 83, Figs. 12, 16, is driven from shaft 56 through a gear 84 fixed on shaft 56, idlers 85, 86, and a reverser generally denoted by the numeral 87. Reverser 87 consists of the gears 88, 89 driven in opposite directions, the gear 88 being driven directly from gear 86, and gear 89 being oppositely driven through a gear 90 meshing with gear 86, a shaft 91 and a gear 92 meshed with gear 89. Positioned between the gears 88, 89 is a clutch member 93 having end teeth 94, 95 adapted for alternative engagement with complementary teeth in the gears 88, 89, the clutch member 93 being slidably keyed on a sleeve 96 which holds the gears 88, 89 in position and is keyed with shaft 83. The clutch member 83 has an intermediate or neutral position free from both gears 88, 89 and may be shifted to its various positions by mechanism later described. The cross movement of saddle 5 may be actuated from the gear 82 through the following mechanism. A cross screw 97 journaled in knee 4 engages a nut 98 fixed with the saddle. Screw 97 may be rotated by engaging a clutch member 99, slidably splined therewith, with a clutch member 100 having fixed thereon a gear 101 which engages gear 82.

Figure 9:
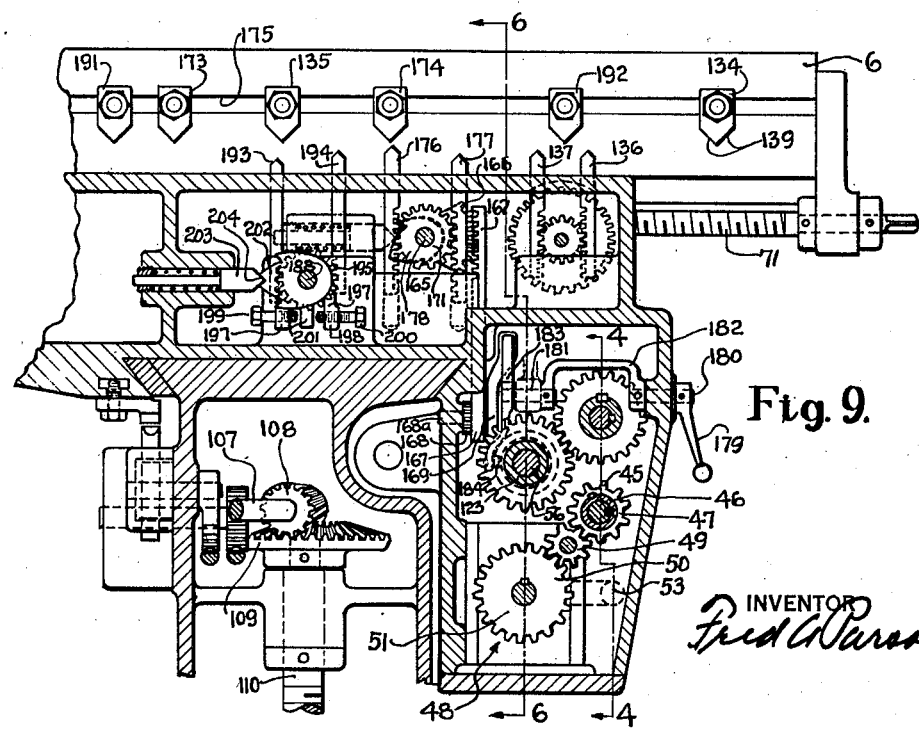
Fig. 9 is a section taken along line 9—9 in Fig. 1.

The vertical movement of knee 4 may be actuated from gear 82 by the following mechanism. A gear 102, Fig. 12, engages gear 82 and is rotatable on a shaft 103. A clutch member 104 slidably keyed on shaft 103 is provided with clutch teeth 105 adapted for engagement with complementary teeth 106 of a clutch member 107 fixed with gear 102. Shaft 103 has fixed thereon a bevel gear 108 engaging a bevel gear 109, Figs. 9, 12, fixed with a vertical screw 110, Figs. 1, 9, which engages a nut 111 fixed with the base of the machine column. Vertical screw 110 is suitably journaled in knee 4 as shown in Figs. 8 and 9.

The mechanism above described will normally be operable to drive the table 6 in either direction in either of its three paths of movement at a feed rate determined by the adjustment of pump 48, but shaft 56 and the knee, table, and saddle may alternatively be driven at quick traverse rate by the following mechanism. Gear 9, Fig. 1, is driven from pulley 2 to exclude clutch 11 and drives a shaft 112 through an idler gear 113 and a gear 114 fixed on shaft 112. A shaft 115 supported from knee 4, Figs. 1, 4, and 12, is driven from shaft 112 through an extensible universal joint shaft 116 of well known design. Shaft 115 is slidably keyed in the base of a sleeve 117 upon which are fixed different diametered gears 118 and 119 respectively meshed with complementary gears 120, 121, rotatably supported and relatively slidable on shaft 56. A sleeve 122 spaces the gears 120, 121 and is slidably keyed on shaft 56 and carries a plurality of clutch members 123, 124, Figs. 6, 12, each slidably splined and respectively having end teeth shiftable for engagement with complementary teeth on the faces of gears 120, 121. The arrangement described is operative for a relatively fast and a relatively slow quick traverse rate of the shaft 56, according to the position of clutch members 123, 124, but either rate when applied to the shaft will cause the shaft to overrun the device 59, previously described, and transmit a quick traverse instead of a feed rate to whatever one of the knee, table, and saddle members which is connected for operation.

Figures 11, 11A:
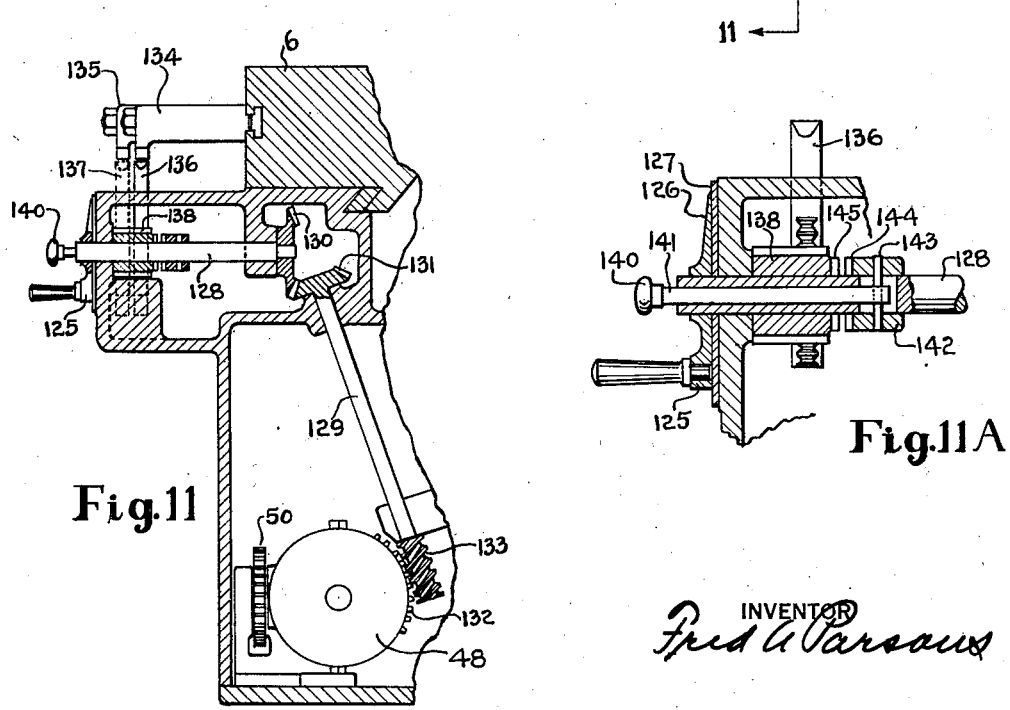
Fig. 11 is a partial section along line 11—11 in Fig. 10.
Fig. 11A is an enlarged partial section of a portion shown in Fig. 11.

The feed rate may be varied by the adjustment of pump 48 to change the volume output thereof. The specific connections for pump adjustment may vary to suit the particular pump which is used, but for the pump shown consists of a hand lever 125, Figs. 1, 11A, movable with a pointer 126 operating against a dial 127 graduated to indicate pump adjustment and resulting feed rate. Lever 125 is fixed on a shaft 128, Figs. 10, 11, connected with a shaft 129 through bevel gears 130, 131, the shaft 129 being connected for movement of a pump adjusting element 132 by the means of a worm 133. It is sometimes desirable to change the feed rate automatically at a predetermined point in the longitudinal movement of table 6. This may be effected by the means of suitable cam dogs 134, 135, Figs. 1, 9, 11, adjustably fixed on the table and respectively adapted to engage and shift the plungers 136, 137 which engage opposite sides of a pinion 138 on shaft 128, whereby the one dog may reduce the feed and the other may increase it. As here shown, the dogs have quick acting cam faces as shown at 139, Fig. 9, for the dog 134, but the cam faces may obviously be of lesser angle as desired to gradually increase or decrease the feed rate over any desired length of table travel. The shaft 128 has nearly a complete revolution for the adjustment of pump 48 through its full range, and this would cause plungers 136, 137 to move too far for practical use, and, moreover, no such range of automatic pump adjustment is required. Means are, therefore, provided for adjusting the pinion 138 and plungers 136, 137 relative to shaft 128 as follows. A hand operated knob 140, Fig. 11A, fixed on a rod 141, connects to shift a clutch member 142 through a key or pin 143. Member 142 has relatively fine spaced clutch teeth 144 engageable in a variety of relative positions with complementary clutch teeth 145 on the pinion 138. By this means the plungers 136, 137 may be set in most advantageous position irrespective of the particular feed rate setting of pump 48. Also by disengaging clutch member 142 the automatic feed control may be rendered ineffective.

Figure 13:
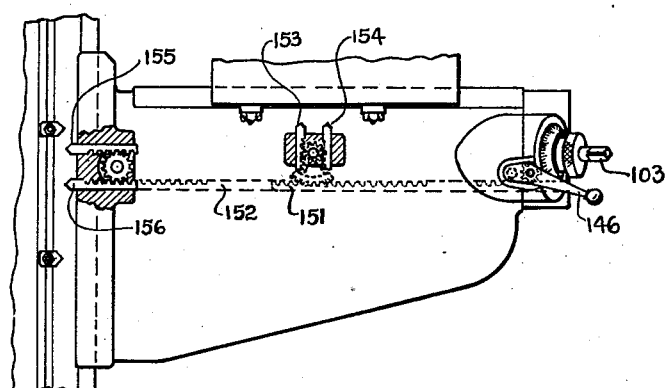
Fig. 13 is a left-side view of the knee with saddle and table removed.
Figure 14:
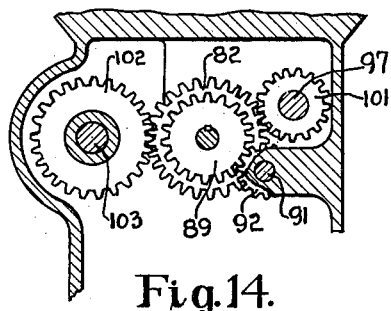
Fig. 14 is a partial section along line 14—14 in Fig. 12.

The reverser clutch member 93, Fig. 12, for cross and vertical movements may be shifted to the one or the other position by the means of a hand lever 146, Figs. 12, 13, fixed on a shaft 147 which carries a lever 148 having a pin or shoe 149 engaging a suitable annular groove in member 93. The clutch member 93 may also be disengaged automatically either from the cross or vertical movement. To effect this result shaft 147 has fixed thereon a gear 150 engaging rack rods 151, 152 respectively connecting with the pair of plungers 153, 154, Fig. 12, and with the pair of plungers 155, 156, Fig. 13, which are adapted for engagement with suitable dogs for shifting the clutch member to neutral or central position.

Figure 15:
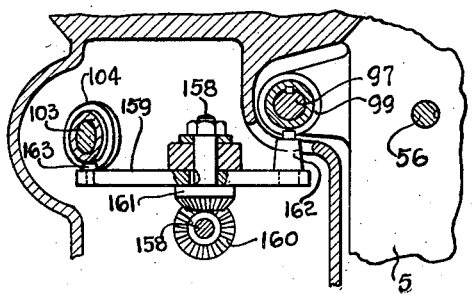
Fig. 15 is a section along line 15—15 in Fig. 12.

The clutch members 99, 104, Fig. 12, respectively selective of cross or vertical movement, are operable for engagement one at a time from a hand lever 157, Figs. 2, 12, 16. Lever 157 is fixed on a shaft 158 connected with a lever 159, Figs. 12, 15, by bevel gears 160, 161. Lever 159 carries pins or shoes 162, 163 respectively engaging annular grooves in the different clutch members 99, 104, the arrangement being such that engaging the one disengages the other clutch member. The lever 159 has an intermediate position in which neither clutch member is engaged.

Control means for effecting alternative feed rate or quick traverse rate will now be explained. As previously described, the engaging of either clutch member 123, 124 effects a quick traverse, causing the driven end of the various knee, saddle, and table trains to overrun the feed train. A lever 164, Figs. 2, 6, and 10, is used for manually shifting high rate quick traverse clutch member 123. Lever 164 is fixed on a shaft 165 journaled in saddle 5 and is fixed with a segment 166 having teeth engaging rack teeth on a rod 167, which also has rack teeth meshing with a gear 168, Figs. 6 and 9, which has fixed therewith a lever 169 carrying a pin or shoe 170 engaging a suitable annular groove in clutch member 123. A cam or detent member 171, Figs. 6, 9, 10, is fixed on shaft 165 and cooperates with a spring pressed plunger 172 to retain the clutch member in its position in or out of engagement. Clutch member 123 may also be automatically operated by the means of table dogs 173 and 174 slidably adjustable in T-slot 175. The dogs may engage the one or the other of plungers 176 and 177, Figs. 6, 9, and in the course of table movement the contacted plunger will be pressed downwardly. Plungers 176 and 177 have rack teeth meshing with a gear 178 fixed on shaft 165 from which motion is transmitted to shift member 123 as explained.

The low rate quick traverse clutch member 124 is operated by a lever 179, Figs. 9, 12, fixed on shaft 180, Fig. 9. A shaft 181 is connected with shaft 180 by a member 182. On shaft 181 is fixed a lever 183, Figs. 6, 9, carrying a pin or shoe 184 engaging a suitable annular groove of the clutch member 124.

The quick traverse clutch members 123 and 124, when engaged, respectively transmit relatively high and relatively low speeds to shaft 56 and therefore must be prevented from simultaneous engagement. To prevent such engagement, interference elements 185, 186, Figs. 6, 9, are respectively fixed on shafts 168a and 181 in a position such as to shift the one member out of engagement if the other is attempted to be engaged.

The high quick traverse is intended to be used for the longitudinal table movement only and the low quick traverse for any cross or for vertical quick traverse movements. The low quick traverse may, however, also be utilized for longitudinal movement, if desired, by operating lever 179 manually.

Reverser 70, Figs. 8 and 10, for the longitudinal movement of table 6, may be manually operated by a lever 187, Figs. 1, 10, fixed on a shaft 188, having fixed on its other end an arm or lever 189, Figs. 6, 10, provided with a pivoted shoe 190 engaging a suitable annular groove in the clutch member 77. Reverser 70 may also be automatically operated by table dogs 191 and 192 adjustably fixed in T-slot 175, Figs. 2 and 9, for contact with one or the other of plungers 193 and 194 having rack teeth meshing with a gear 195, Figs. 9, 10, rotatably supported on shaft 188. Fixed with gear 195 is a member 196 with abutment lugs 197 and 198 carrying adjustable screw elements 199 and 200 adapted to engage an abutment element 201 fixed with a cam 202 or detent which in turn is fixed on shaft 188 and cooperates with a spring pressed plunger 203. The cam 202 has a central notch 204 and if the screws 199, 200 are each adjusted against the abutment 201, dog operation of the plungers 193 or 194 will force the clutch member 77 out of its position of engagement, the notch retaining the clutch member in its central or neutral position. If, however, the one or the other screw 199, 200 is adjusted to provide sufficient lost motion, the cam or detent 202 will move before the clutch disengages sufficiently for the detent to have passed the central notch, and when the clutch finally is disengaged, the detent will shift the clutch quickly to its other engaged position, thus effecting an automatic table reverse at the one or the other end of table movement according to which of the screws has been given lost motion adjustment. If both screws provide lost motion, the table will be reversed at each end of its travel, but if only one provides lost motion, reversal will take place at one end and a stop at the other.

It will be noted that as disclosed herein, the two available rapid traverse rates, while not simultaneously operative, may be applied to either the knee, saddle, or table movements. It is contemplated, however, that in practice interference mechanism may be provided, preventing the operation of the faster rapid traverse for movement of the knee or saddle. This mechanism is contemplated in a form similar to that shown in the Patent 1,799,272, issued April 7, 1931, in which the mechanism is operative to prevent fast, rapid traverse whenever the clutch mechanism selective of the knee or saddle movement is in engaged position, or in an alternative form shown in an application Serial No. 88,806, filed February 17, 1926, in which the interference operates from the knee and saddle reversing device, or in other suitable form.

What is claimed is:

1. In a milling machine, the combination of a column, a tool spindle rotatably supported from said column, a knee, a saddle and a table each supported from said column for unitary vertical movement and collectively providing for movement of said table relative to said column in a plurality of mutually transverse paths, and transmission mechanism for movement of said table in each of said paths including a power source, a hydraulic transmission comprising a variable delivery pump, a rotatable shaft, a motor operative from said pump for rotation of said shaft at a relatively slow feed rate and a plurality of mechanical trains each operable from said shaft and respectively operable for table movement in different of said paths, one of said trains including clutch operated reversing mechanism individual to the path corresponding to the train.

2. In a milling machine, the combination of a column, a tool spindle rotatably supported from said column, a knee, a saddle and a table each supported from said column for unitary vertical movement and collectively providing for movement of said table relative to said column in a plurality of mutually transverse paths, a rotary shaft, a plurality of branch lines each driven from said shaft and respectively operable for table movement in different of said paths and a plurality of trains for driving said rotary shaft, one of said trains including a variable delivery pump and a fluid operable motor driven from said pump selectively at a variety of relatively slow feed rates and another of said trains including clutch means operable to drive said shaft at a relatively fast, quick traverse rate exclusive of said pump and motor.

3. In a milling machine, the combination of a column, a tool spindle rotatably supported from said column, a knee, a saddle and a table each supported from said column for unitary vertical movement and collectively providing for movement of said table relative to said column in a plurality of mutually transverse paths, a rotary shaft, a plurality of branch lines each driven from said shaft and respectively operable for table movement in different of said paths and a plurality of trains for driving said rotary shaft, one of said trains including a variable delivery pump and a fluid operable motor driven from said pump selectively at a variety of relatively slow feed rates, another of said trains including clutch means and a first pair of gears, and still another of said trains including clutch means and a second pair of gears, said gear pairs being of different ratio, and each of the two last mentioned trains being operative to drive said shaft at a relatively fast, quick traverse rate.

4. In a milling machine, the combination of a column, a tool spindle rotatably supported from said column, a knee, a saddle and a table each supported from said column for unitary vertical movement and collectively providing for movement of said table relative to said column in a plurality of mutually transverse paths, a rotary shaft, a plurality of branch lines each driven from said shaft and respectively operable for table movement in different of said paths, a plurality of trains for driving said rotary shaft, one of said trains comprising a variable delivery pump and a fluid operable motor driven from said pump selectively at one or another of a variety of relatively slow feed rates, another of said trains including clutch means operable to drive said shaft exclusive of said pump and motor at a relatively fast, quick traverse rate, and control means for said clutch means including a trip device adjacent said table and connected with said clutch means and a dog on said table adapted to shift said trip device during table movement.

5. In a milling machine, the combination of a column, a tool spindle rotatably supported from said column, a knee, a saddle and a table each supported from said column for unitary vertical movement and collectively providing for movement of said table relative to said column in a plurality of mutually transverse paths, a rotary shaft, a plurality of branch lines each driven from said shaft and respectively operable for table movement in different of said paths, a plurality of trains for driving said rotary shaft, one of said trains comprising a variable delivery pump and a fluid operable motor driven from said pump selectively at one or another of a variety of relatively slow feed rates, an overrunning device normally connecting said motor and shaft, and another of said trains including clutch means operable to connect the train and shaft to be operated at a relatively fast, quick traverse rate exclusive of said pump, motor and device.

6. In a milling machine, the combination of a work support and a rotatable tool spindle, said support and spindle being relatively movable in a plurality of mutually transverse paths each transverse to the axis of said spindle, power operable trains for movement of said support including a plurality of screws respectively individual to different of said paths, a rotatable member, means for selective connection of said member with each of said screws, and a power train connectible with said member and including in the order recited a power source, a variable delivery pump, and a rotatable fluid operable motor driven from said pump at a relatively slow feed rate.

7. In a milling machine, the combination of a work support and a rotatable tool spindle, said support and spindle being relatively movable in a plurality of mutually transverse paths each transverse to the axis of said spindle, power operable trains for movement of said support including a plurality of screws respectively individual to different of said paths, a rotatable member, means for selective connection of said member for driving each of said screws, and transmission mechanism for driving said member including a feed rate train providing a fluid operable portion adjustable for varying the feed rate and an alternatively available relatively fast quick traverse train connectible with said member to exclude said fluid operable portion.

8. In a milling machine, the combination of a work support and a rotatable tool spindle said support and spindle being relatively movable in a plurality of mutually transverse paths each transverse to the axis of said spindle, power operable trains for movement of said support including a plurality of screws respectively individual to different of said paths, a rotatable member, means for selective connection of said member for driving each of said screws, transmission mechanism for driving said member including a feed rate train providing a fluid operable portion adjustable for varying the feed rate, and means for adjustment of said fluid operable portion including an element supported for adjustment adjacent said support and a cam adapted during support movement to contact and shift said element at a predetermined point of support movement.

9. A milling machine as specified in claim 8 in which the connection of said element for adjustment of said fluid operable portion includes means for altering the relative position of said element while maintaining said fluid operable portion in a given position of adjustment.

10. In a milling machine, the combination of a work support and a rotatable tool spindle, said support and spindle being relatively movable in a plurality of mutually transverse paths each transverse to the axis of said spindle, a spindle train including in the order recited a power source, a motion interrupter, a rate changer, and said spindle, power operable trains for movement of said support including a plurality of rotatable screws respectively individual to different of said paths, a shaft connectible for driving each of said screws, a first power train for driving said shaft and including in the order recited said power source, said motion interrupter, a rate changer comprising a fluid pump and a rotatable fluid operable motor, and a second train alternatively available for driving said shaft from said power source exclusive of said motion interrupter, pump and motor.

11. A milling machine as specified in claim 3 including means preventing simultaneous connection of two of said trains to drive said shaft.

12. In a milling machine, the combination of a column, a knee, a saddle and a table each movably supported from said column for unitary vertical movement and collectively providing movement of said table in a plurality of mutually transverse paths, and transmission mechanism for movement of said table in each of said paths including a plurality of mechanical trains respectively individual to different of said paths, a shaft rotatably supported from said knee and connectible for operation of each of said trains, a hydraulic transmission including a rate changer comprising a pump and a rotatable fluid operable motor each supported from said knee and connectible for rotation of said shaft selectively at a variety of rates, and control means for said transmission including means for reversal of each of said trains and comprising reversing means individual to one of said trains.

13. In a milling machine, the combination of a column, a tool spindle rotatably supported from said column, a knee slidably guided on said column for bodily vertical movement, table supported on said knee for unitary movement therewith and for individual horizontal movement transverse to the axis of said tool spindle, a power train including in the order recited a power source, a main clutch, a spindle rate changer and said spindle, a member rotatably supported from said knee for bodily movement therewith, a first transmission for driving said member including an adjustable feed rate changer carried by said knee for vertical movement therewith and a train driven through said main clutch, for actuation of said rate changer, a second transmission including a driving member mounted on said column and a train connectible with said member exclusive of said main clutch and feed rate changer.

14. In a milling machine, the combination of a column, a tool spindle rotatably supported from said column, a knee slidably guided on said column for bodily vertical movement, table supported on said knee for unitary movement therewith and for individual horizontal movement transverse to the axis of said tool spindle, a power train including in the order recited a power source, a main clutch, a spindle rate changer and said spindle, a member rotatably supported from said knee for bodily movement therewith, a first transmission for driving said member including an adjustable feed rate changer carried by said knee for vertical movement therewith, and a train driven through said main clutch for actuation of said rate changer, a second transmission including a driving member mounted on said column and a train connectible with said member exclusive of said main clutch and feed rate changer, and control means for said transmission including means for alternative connection of the one or the other of said trains to drive said member, means for adjusting said feed rate changer, and a plurality of hand levers each supported for vertical movement with said knee and respectively connected for operation of the different means.

15. In a milling machine, the combination of a column, a tool spindle rotatably supported from said column, a knee slidably guided on said column for bodily vertical movement, table supported on said knee for unitary movement therewith and for individual horizontal movement transverse to the axis of said tool spindle, a power train including in the order recited a power source, a main clutch, a rate spindle rate changer and said spindle, a transmission mechanism for actuation of said table including a co-operating screw element and nut element bodily movable with said knee, a reverser bodily movable with said knee and connectible for actuation of one of said elements in either direction, a first uni-directional train-connectible for actuation of said reverser including said main clutch and an adjustable feed rate changer carried by said knee for vertical movement therewith, a second uni-directional train alternatively connectible with said reverser exclusive of said main clutch and feed rate changer.

16. In a milling machine, the combination of a column, a tool spindle rotatably supported from said column, a knee slidably guided on said column for bodily vertical movement, table supported on said knee for unitary movement therewith and for individual horizontal movement transverse to the axis of said tool spindle, a power train including in the order recited a power source, a main clutch, a spindle rate changer and said spindle, a transmission mechanism for actuation of said table including a co-operating screw element and nut element, bodily movable with said knee, a reverser bodily movable with said knee and connectible for actuation of one of said elements in either direction, a first uni-directional train-connectible for actuation of said reverser including said main clutch and an adjustable feed rate changer carried by said knee for vertical movement therewith, a second uni-directional train alternatively connectible with said reverser exclusive of said main clutch and feed rate changer, and control means for said transmission mechanism including a first hand lever having motion transmitting connection with said reverser, means for alternative connection of said train with said reverser and a second hand lever having motion transmitting connection with said means, each of said hand levers being supported for vertical bodily movement with said knee.

FRED A. PARSONS.